UNITED STATES PATENT OFFICE.

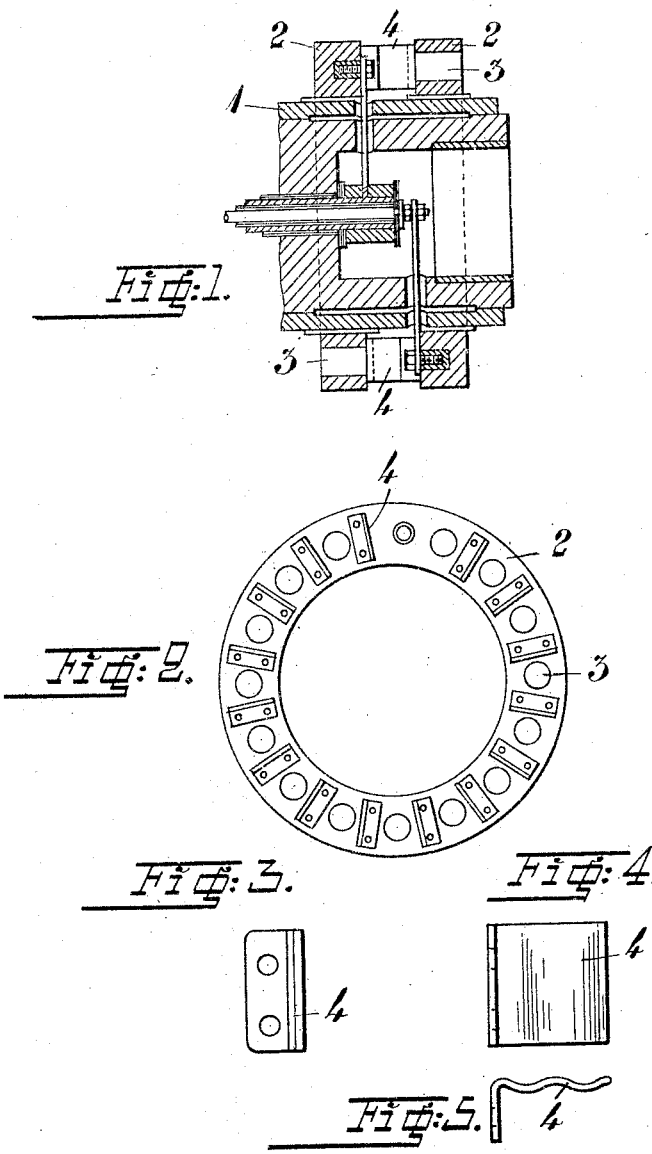

WILHELM ROBERT UGGLA, OF FINSPONG, SWEDEN, ASSIGNOR TO SVENSKA TURBINFABRIKS AKTIEBOLAGET LJUNGSTRÖM, OF FINSPONG, SWEDEN, A CORPORATION OF SWEDEN.

MEANS FOR COOLING THE COLLECTOR-RINGS OF DYNAMO-ELECTRIC MACHINES.

1,277,783. Specification of Letters Patent. Patented Sept. 3, 1918.

Application filed December 20, 1917. Serial No. 208,122.

*To all whom it may concern:*

Be it known that I, WILHELM ROBERT UGGLA, a citizen of the Kingdom of Sweden, residing at Finspong, Sweden, have invented new and useful Improvements in Means for Cooling the Collector-Rings of Dynamo-Electric Machines, of which the following is a specification.

This invention relates to improved means for cooling the collector rings of dynamo-electric machines of the kind, in which the collector rings are provided with holes extending axially through the rings and with lateral wings arranged alternately with relation to said holes.

According to this invention an increased cooling effect is obtained by arranging the wings of adjacent collector rings on the sides of said rings facing each other in such a manner that the wings of one ring engage the space between the wings of an adjacent ring.

In the accompanying drawing I have shown an embodiment of my invention. Figure 1 is a longitudinal section through part of a dynamo-electric machine constructed in accordance with this invention. Fig. 2 is an end view of a collector ring. Figs. 3–5 show a cooling wing from different sides.

Referring to the drawing, Fig. 1, 1 is the shaft of the rotor, and 2 the collector rings secured thereon and insulated therefrom. The collector rings are formed with holes 3 extending axially therethrough and are further provided with wings 4 on the surfaces facing each other. The effective portions of said wings are situated in planes through the axis of the shaft 1. The mutual arrangement of the wings is such that the wings of one of the collector rings engage the spaces between the wings of the adjacent ring. The wings 4 are preferably secured to the collector rings by means of screws which may be secured by soldering to prevent loosening thereof.

During the rotation of the shaft the wings 4 will act as fan-wings and will produce an effective ventilation around the collector rings; moreover, said wings as well as the holes 3 will increase the heat emitting surface of the collector rings considerably thereby aiding in a rapid carrying off of the heat from the collector rings.

In order to still more increase the heat emitting surface the wings 4 may be wave-shaped, as shown in Figs. 4–5.

The invention is adapted for use particularly in connection with high-speed electric generators, as for instance turbo-generators, in which the dimensions of the collector rings must be held within small limits on account of the centrifugal force. By constructing said collector rings in accordance with this invention it is possible to keep the temperature of the collector rings within permissible limits.

What I claim as new and desire to secure by Letters Patent, is:

1. The combination with the collector rings of a dynamo-electric machine having holes axially extending through said rings, of lateral wings on the surfaces of said rings facing each other.

2. The combination with the collector rings of a dynamo-electric machine having holes extending axially through said rings, of lateral wings on the surfaces of said rings facing each other, the wings of one of the rings engaging the spaces between the wings of the other ring.

3. The combination with the collector rings of a dynamo-electric machine having holes extending axially through said rings, of lateral wave-shaped wings on the surfaces of said rings facing each other, the wings of one of the rings engaging the spaces between the wings of the other ring.

In testimony whereof I have signed my name.

WILHELM ROBERT UGGLA.

Copies of this patent may be obtained for five cents each, by addressing the "Commissioner of Patents, Washington, D. C."